Jan. 6, 1970  J. A. STAPENHILL  3,487,470
SIDE TRACK DUAL VISOR HELMET
Filed March 9, 1967  2 Sheets-Sheet 2
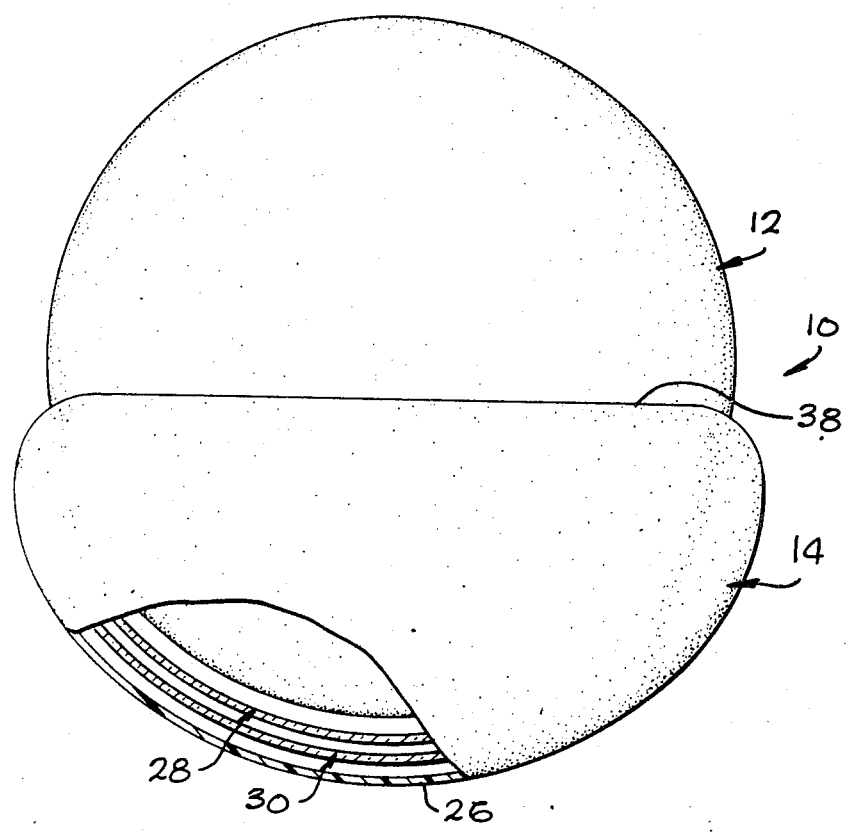
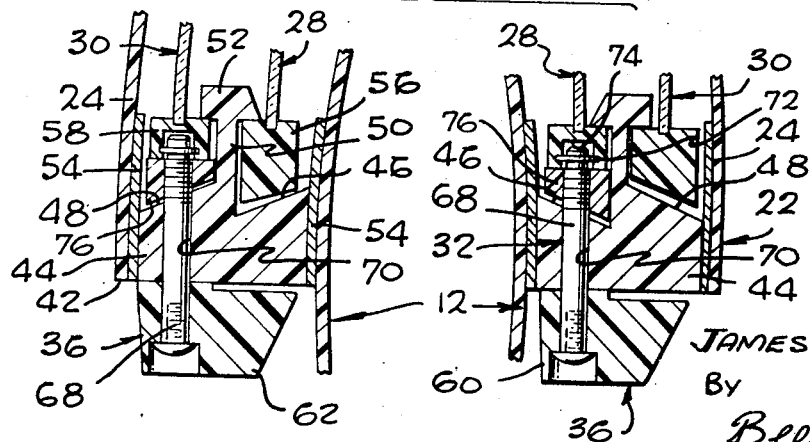
INVENTOR
JAMES A. STAPENHILL
By
Beehler & Arant
ATTORNEYS ID # United States Patent Office 3,487,470
Patented Jan. 6, 1970

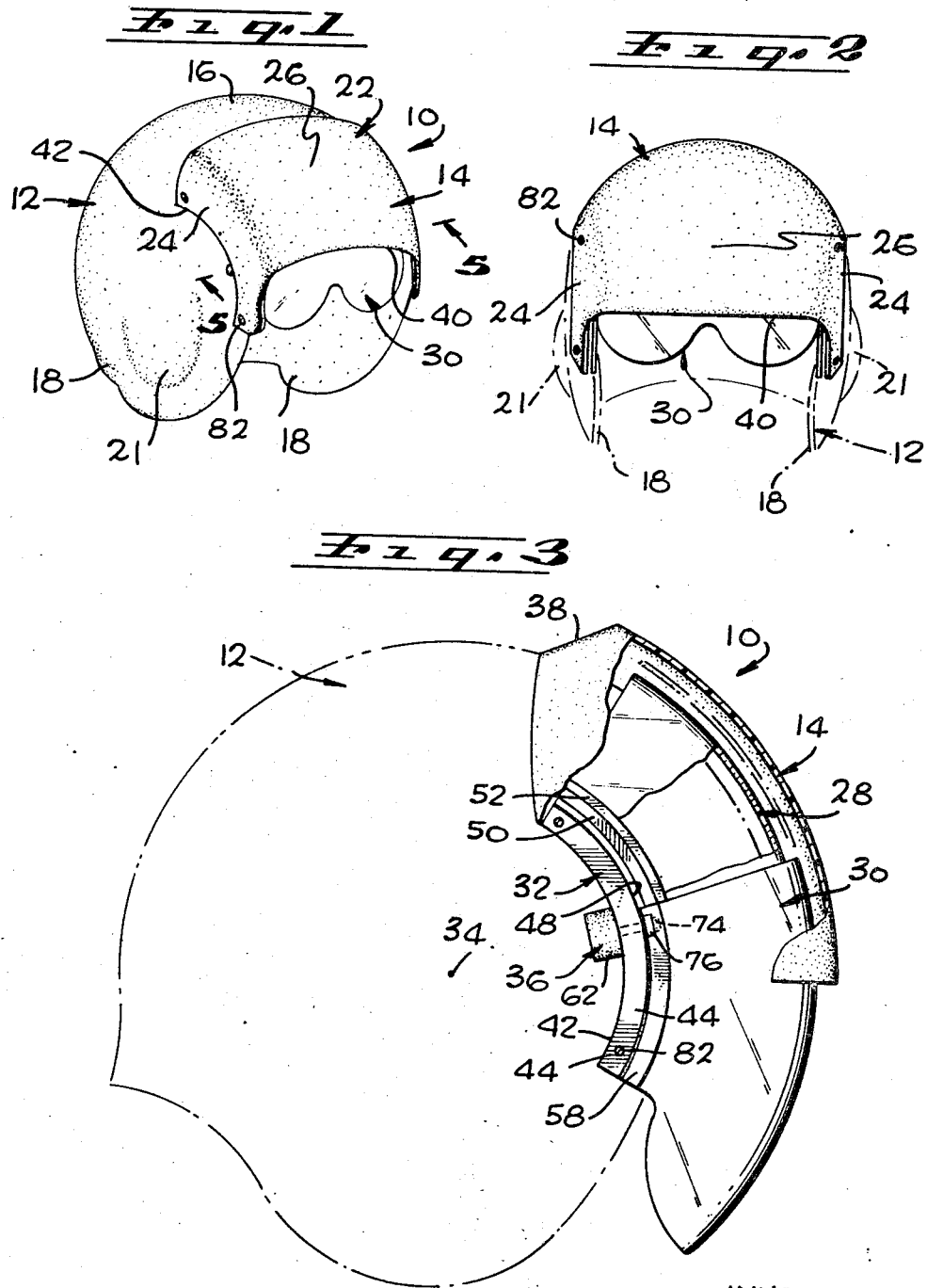

3,487,470
SIDE TRACK DUAL VISOR HELMET
James Arthur Stapenhill, Glendora, Calif., assignor to Sierra Engineering Company, Sierra Madre, Calif., a corporation of California
Filed Mar. 9, 1967, Ser. No. 621,842
Int. Cl. A42b 3/00
U.S. Cl. 2—6                                3 Claims

ABSTRACT OF THE DISCLOSURE

A dual visor assembly for a protective helmet including clear and tinted transparent visors having flush mounted operating buttons located at opposites sides of the helmet for selectively extending the visors into and retracting the visors from the wearer's field of vision.

---

This invention relates generally to protective headgear and, more particularly, to an improved visor assembly for protective helmets.

Aircraft pilots and other persons engaged in activities which expose the eyes to intense light, glare, wind, airborne particles, and/or other external conditions that impair vision generally wear visor means for shielding the eyes against such conditions. However, most if not all activities of this nature present a varying need for eye shielding. For example, the external light conditions to which a pilot is exposed may vary between the extremes of intense sunlight and glare and relative darkness, while the need for physical shielding of the eyes continues. On other occasions, it may be desirable or necessary for a pilot to wear visor means under conditions which impose no need for eye shielding and/or render it inconvenient to have an eye shield positioned in front of the eyes. For this reason, an ideal visor means will accommodate adjustment of the effective light attenuation or transmission characteristics of the visor eye shielding means as well as extension of the shielding means into and retraction of these shielding means from the wearer's field of vision. Moreover, most if not all activities involving a need for eye shielding also require physical protection of the head against injury. For this reason, persons engaged in such activities commonly wear protective helmets in addition to visor means.

My copending application Ser. No. 608,948, filed Dec. 19, 1966, entitled Visor, discloses a novel helmet visor assembly for persons engaged in activities of the kind under discussion, particularly aircraft pilots. This prior visor assembly is characterized by certain novel features of construction which uniquely adapt the assembly of such usage. Generally speaking, the prior visor assembly includes a frame for attachment to a protective helmet and a pair of transparent eye shields, or visors mounted on the frame for selective extension into and retraction from the wearer's field of vision. In a typical visor assembly, one visor is clear and the other visor is tinted, whereby the effective light attenuation or transmission characteristics of the assembly may be varied by selectively extending the visors. The visor frame defines a protective housing which receives and protects the visors against damage when retracted. My prior visor assembly is so designed that it may be attached to a protective helmet at the time of manufacture for sale as complete protective headgear or sold in kit form for attachment to an existing helmet. A major improvement of the visor assembly resides in visor operating means located at the sides of the helmet for selectively extending and retracting the transparent visors.

A general object of this invention is to provide certain improvements for my prior visor assembly.

A more specific object of the invention is to provide a visor assembly of the character described wherein the side operating means for selectively extending and retracting the transparent visors have a unique flush mounting which facilitates adjustment of the visors, eliminates the possibility of interference of the operating means with other equipment, such as parachute lines, and reduces the overall cost and weight of the visor assembly.

Other objects, advantages, and features of the invention will become readily evident as the description proceeds.

With these and such other objects in view, the invention consists of the construction, arrangement, and combination of the various parts of the visor assembly, whereby the objects contemplated are attained, as hereinafter set forth, pointed out in the appended claims, and illustrated in the accompanying drawings.

In these drawings:

FIGURE 1 is a perspective view of protective headgear embodying a dual visor assembly according to the invention;

FIGURE 2 is a front elevation of the visor assembly in FIGURE 1;

FIGURE 3 is an enlarged side elevation, partly in section, of the visor assembly;

FIGURE 4 is an enlarged top plan view of the protective headgear in FIGURE 1 with parts broken away for the sake of clarity; and FIGURE 5 is an enlarged section taken on line 5—5 in FIGURE 1.

The protective headgear 10 which has been selected for illustration in the drawings includes a protective helmet 12 proper and a dual visor assembly 14 according to the invention secured to the outside of the helmet. Helmet 12 is conventional and, accordingly, need not be described in detail. Suffice it to say that the helmet has a generally semi-spherical crown 16 and depending side lobes 18. The front of the helmet crown projects forwardly of the side lobes, as shown, and defines a downwardly presented, forwardly arching crown edge (not shown) which extends horizontally across the front face opening of the helmet. The helmet side lobes 18 have generally circular, spherically curved protrusions which define, within the helmet, shallow clearance recesses for the wearer's ears. It will be understood that suitable means, such as a chin strap, will be provided for retaining the helmet on the wearer's head.

Generally speaking, the visor assembly 14 of this invention comprises a frame 22 having side portions or walls 24 which straddle the sides of the helmet 12 and a crown portion or wall 26 which extends across the front half of the helmet crown 16, just above the front face opening of the helmet, and a pair of transparent visors 28 and 30 which extend between and have ends located adjacent the side walls 24, respectively, of the visor frame 22. Visor 28 is disposed adjacent the helmet 12 and, for this reason, is referred to as an inner visor. Visor 30 is located outwardly of the visor 28 and is referred to as an outer visor. The ends of the visors 28, 30 are secured to the visor frame 22 by coacting mounting means 32 on the visors and frame. These mounting means support the visors for independent fore and aft rotation relative to the helmet 12 about a common rotation axis 34 passing substantially through the centers of the helmet side lobe protrusions 21. Each visor is rotatable forwardly and downwardly relative to the helmet to an extended position of use, wherein the visor is disposed in front of the helmet face opening and, therefore, in the field of vision of the wearer. Each visor is rotatable upwardly and rearwardly to a retracted position in which the visor is located above the helmet face opening and thus out of the wearer's field of vision. The solid lines in FIGURE 3 illustrate the inner visor 28 in its retracted position and the outer visor 30 in its extended position. The broken lines in FIGURE 3 illustrate the outer visor in its retracted position. The major contribution of the present invention resides in novel, flush mounted visor operating means 36 for moving the visors to and releasably securing the visors in various positions of adjustment. The operating means for the inner visor 28 are located at one side of the helmet 12, and the operating means for the other visor are located at the opposite side of the helmet. This side placement of the visor operating means locates the same in the most convenient position to the wearer and, in addition, provides the helmet with a desirable low profile. As will appear presently, however, the major advantage of the present visor operating means resides in the flush mounting which locates these operating means in such a way that they are not prone to interference with external equipment, such as parachute lines in the event the wearer is a pilot who is forced to bail out from his aircraft.

Referring now in greater detail to the visor assembly 14, the visor frame 22 has a relatively thin wall of generally uniform thickness. This frame may be fabricated in any convenient way from plastic or other suitable material. The side and crown walls 24, 26 of the visor frame are spaced from and have substantially the same curvature as the underlying surface of the helmet 12. Along the rear upper edge of the visor frame is an inwardly directed seating flange 38 which seats against the outer surface of the helmet. Visors 28 and 30, when retracted, are disposed within the space between the helmet and the visor frame crown wall 26. This visor frame crown wall thus defines, in effect, a protective housing for containing the retracted visors and shielding the latter against damage. The lower front edge 40 of the visor frame wall 26 is located substantially flush with the front crown edge of the helmet 12 and defines with the latter helmet edge an opening through which the visors 28, 30 move between their extended and retracted positions. The visors have substantially the same curvature as the visor frame 22 and the underlying helmet surface, whereby the latter surface, the visor frame, and the visors are generally uniformly spaced throughout their entire area, as shown. The side walls 24 of the visor frame 22 extend below the front edge 40 of the frame crown wall 26, along opposite sides of the front face opening in the helmet 12 and have circularly curved front edges which define the sides of the face opening.

The mounting means 32 for the transparent visors 28, 30 comprise circularly curved guide blocks 44 which are interposed between the helmet 12 and the visor frame side walls 24, flush with the curved lower edges 42 of these walls. Guide blocks 44 have curved longitudinally extending inner and outer channels 46, 48 opening through their upper surfaces. The upstanding rib 50 defined between the two channels 46, 48 in each block 44 has a laterally enlarged retaining shoulder 52 along its upper edge which projects laterally over the adjacent channels, as shown best in FIGURE 5. Interposed between the guide blocks 44 and the helmet 12 and adjacent visor frame side walls 24 are curved plates 54 which form the inner walls of the inner channels 46 and the outer walls of the outer channels 48, respectively. As will appear from the ensuing description, these channels serve as guide tracks and, for this reason, are hereinafter referred to as guide tracks, or simply tracks. Referring to FIGURE 3, it will be observed that the visor frame side wall edges 42, blocks 44, plates 54, and the guide tracks 46, 48 defined by the blocks and plates are circularly curved about the axis 34 of the helmet side lobe protrusions 21 as a center. The visor mounting means 32 further comprise inner and outer guide shoes 56 and 58 which are grooved along their upper edges to receive and are adhesively bonded or otherwise secured to the ends of the inner and outer visors 28, 30, respectively. These guide shoes are also circularly curved about the axis 34 as a center and are slidably disposed within the inner and outer guide tracks 46, 48, respectively. The guide shoes are retained in their respective tracks by the shoulders 52 on the central guide block ribs 50. It is now evident that the visor mounting means 32 support the visors 28, 30 on the visor frame 22 for fore and aft rotation about the axis 34 between their extended and retracted positions.

The operating means 36 for the visors 28, 30 comprise visor operating buttons 60 and 62 which are located at opposite sides of the helmet 12, in seating contact with the lower concave surfaces of the guide blocks 44, and are shaped to be gripped between the thumb and forefinger. Fixed to each operating button is a pin 68 which projects through a longitudinal slot 70 in the adjacent guide block 44. Pin slot 70 for the visor operating button 60 opens to the inner guide track 46 in the righthand guide block 44, as the visor is viewed in FIGURE 5. The pin slot for the visor operating button 62 opens to the outer guide track 48 in the lefthand guide block 44. The upper end of pin 68 for the visor operating button 60 mounts a snap ring 72 which engages in an external groove in the pin an internal groove in a socket 74 in the righthand guide shoe 56 for the inner visor 28. The upper end of pin 68 for the visor operating button 62 also mounts a snap ring 72 which engages in a groove in a socket 74 in the lefthand guide shoe 58 for the outer visor 30. Threaded on the upper end of each pin below the adjacent visor guide shoe 56 or 58, as the case may be, is a slider 76 which is restrained against rotation by the walls of its containing tracks 46 or 48. Rotation of each visor button 60, 62 in one direction draws the button and its respective slider toward one another and into clamping engagement with the intervening guide block. At this point, it is evident that each visor 28 and 30 may be selectively extended and retracted by gripping and rotating its respective operating button 60, 62 in a direction to release the visor and moving the button forwardly or rearwardly, as the case may be. Each visor may be selectively locked in its extended and retracted positions, as well as in any desired intermediate position, by rotating its operating button in the opposite direction. It will be understood, of course, that each pin slot 70 has a sufficient length or span longitudinally of its respective guide block 44 to accommodate full extension and retraction of the corresponding visor. It is significant to recall that the visor operating buttons 60, 62 are shaped to be gripped between the thumb and forefinger, thus to facilitate adjustment and locking of the visors in the manner just explained. It is evident, of course, that the visor button 60 is operated with the left hand and the visor button 62 is operated with the right hand.

As noted earlier, a major advantage of the present visor operating means 36 resides in the flush mounting of the visor operating buttons 60, 62, whereby these buttons do not project beyond the sides of the visor frame 22. As a consequence, the buttons are not prone to interference with other equipment, such as snagging parachute lines, for example, in the event the wearer is a pilot who is forced to bail out of his aircraft. The present visor assembly is also characterized by maximum simplicity of construction and minimum weight and cost.

The present visor assembly 14 is designed for attachment to the helmet 12 at the time of manufacture or for sale in kit form for subsequent attachment to an existing helmet. To this end, the visor frame 22 is provided with any convenient means of attachment to the helmet. The illustrated visor assembly, for example, is secured to the helmet 12 by means of rivets 82.

Visors 28, 30 may have any desirable light transmission or attenuation characteristics. In a typical dual visor helmet according to the invention, however, one of the visors will be clear and the other visor will be tinted. In this case, the clear visor serves primarily as a shield for protecting the wearer's face and eyes against wind, airborne particles, and the like. The tinted visor serves to shield the wearer's eyes against intense light and glare. In some cases, both visors may be tinted to provide greater latitude of adjustment of the effective light attenuation provided by the visors. In this regard, of course, it is obvious from the preceding description that either visor may be extended independently of the other visor, or both visors may be extended simultaneously. As noted earlier, the visors, when retacted, are contained within the visor frame 22 and are thereby shielded against damage.

What is claimed as new in support of Letters Patent is:

1. A visor assembly for attachment to a protective helmet comprising a visor frame including spaced side walls and an arcuate crown wall extending between and joining said side walls, said visor frame being shaped to be mounted on said helmet in such a way that said side walls straddle the sides of said helmet and said crown wall extends over the helmet above the front face opening of the helmet, an arcuate translucent visor extending between and having ends adjacent said frame side walls, respectively, coacting mounting means on said visor ends and frame side walls supporting said visor on said visor frame for arcuate fore and aft movement relative to said frame in such manner that said visor is movable forwardly and downwardly relative to said frame to an extended position of use and said visor is movable upwardly and rearwardly from said position of use to a retracted position, said mounting means comprising curved guide blocks secured to said frame side walls, respectively, and defining upwardly open curved guide tracks, guide shoes secured to said visor ends slidable in said guide tracks, respectively, visor operating means for moving said visor between said extended and retracted positions including a visor operating button located adjacent the undersurface of one guide block, one of said guide blocks having a longitudinal slot and a pin extending from said button through said longitudinal slot and engaging the adjacent visor guide shoe, said visor operating button being rotatable about the axis of said pin, and locking means operable by rotation of said button for locking said visor in a fixed position upon rotation of said button in one direction and releasing said visor for adjustment to another position upon rotation of said button in the opposite direction, said pin being secured to said button for rotation with said button, said locking means comprising a slider threaded on said pin between the adjacent guide block and visor guide shoe, whereby rotation of said button in said one direction draws said button and slider toward one another into clamping engagement with the intervening guide block to lock said visor in a fixed position and rotation of said button in the opposite direction releases said visor for adjustment to another position.

2. A visor assembly for attachment to a protective helmet comprising a visor frame including spaced side walls and an arcuate crown wall extending between and joining said side walls, said visor frame being shaped to be mounted on said helmet in such a way that said side walls straddle the sides of said helmet and said crown wall extends over the helmet above the front face opening of the helmet, an arcuate translucent visor extending between and having ends adjacent said frame side walls, respectively, coacting mounting means on said visor ends and frame side walls supporting said visor on said visor frame for arcuate fore and aft movement relative to said frame in such manner that said visor is movable forwardly and downwardly relative to said frame to an extended position of use and said visor is movable upwardly and rearwardly from said position of use to a retracted position, said mounting means comprising curved guide blocks secured to said frame side walls, respectively, and defining upwardly open curved guide tracks, guide shoes secured to said visor ends slidable in said guide tracks, respectively, visor operating means for moving said visor between said extended and retracted positions including a visor operating button located adjacent the undersurface of one guide block, one of said guide blocks having a longitudinal slot and a pin extending from said button through said longitudinal slot and engaging the adjacent visor guide shoe, a second transparent visor extending between said frame side walls in overlying relation to said first mentioned visor, whereby said first mentioned visor comprises an inner visor and said second visor comprises an outer visor, said second visor having ends adjacent said frame side walls, respectively, coacting mounting means on said second visor ends and said frame side walls supporting said second visor on said visor frame for arcuate fore and aft movement relative to said frame independently of and generally parallel to said inner visor in such manner that said second visor is movable forwardly and downwardly relative to said frame to an extended position of use and said second visor is movable upwardly and rearwardly from its position of use to a retracted position, said last mentioned mounting means comprising second upwardly open curved guide tracks in said guide block outward of and generally parallel to said first mentioned guide tracks, and second guide shoes slidable in said second guide tracks, respectively, and secured to the adjacent ends of said second visor, second visor operating means for moving said second visor between its extended and retracted positions including a second visor operating button located adjacent the undersurface of the other guide block, said other guide block having a longitudinal slot therein and a pin extending from said second button through said longitudinal slot and engaging the adjacent guide shoe of said second visor, each said visor operating button being rotatable about the axis of its respective pin, and locking means operable by rotation of each button for locking the corresponding visor in a fixed position upon rotation of the respective button in one direction and releasing the corresponding visor for adjustment to another position upon rotation of the respective button in the opposite direction, each said pin being secured to its respective visor operating button for rotation by the latter, said locking means comprising a slider threaded on each pin between the adjacent guide block and visor guide shoe, whereby rotation of each visor operating button in said one direction draws the respective button and slider toward one another into clamping engagement with the intervening guide block to lock the corresponding visor in a fixed position and rotation of each visor operating button in the opposite direction releases the corresponding visor for adjustment to another position.

3. In combination:

a protective helmet having a crown, side lobes, and a front face opening, visor means on said helmet comprising a translucent visor having ends located at opposite sides, respectively, of said helmet, mounting means supporting said visor on said helmet for arcuate fore and aft movement relative to said helmet between an extended position of use wherein said visor is disposed in front of said face opening and a retracted position wherein said visor extends across the front side of said helmet crown above said face opening, said mounting means comprising curved guide blocks secured to opposite sides of said helmet and defining upwardly open curved guide tracks and guide shoes slidable in said guide tracks, respectively, and secured to the adjacent visor ends, visor operating means for moving said visor between said extended and retracted positions including a visor operating button located adjacent the underside of one guide block, said one guide block having a longitudinal slot therein and a pin extending from said button through said longitudinal slot and engaging the adjacent visor guide shoe, a second translucent visor overlying said first mentioned visor, whereby said first mentioned visor comprises an inner visor and said second visor comprises an outer visor, said second visor having ends located adjacent guide blocks, respectively, said guide blocks having second upwardly open curved guide tracks outward of and generally parallel to said first mentioned guide tracks, second guide shoes slidable in said second guide tracks and secured to the adjacent ends of said second visor, said second visor being movable independently of and generally parallel to said inner visor between an extended position of use wherein said second visor is disposed in front of said helmet face opening and a retracted position wherein said second visor extends across the front side of said helmet crown above said face opening, and visor operating means for moving said second visor between its extended and retracted positions including a second visor operating button located adjacent the undersurface of the other guide block, said other guide block having a longitudinal slot therein and a pin extending from said second button through said longitudinal slot and engaging the adjacent second visor guide shoe, each said visor operating button being rotatable about the axis of its respective pin and each pin being secured to its respective button for rotation with the latter, and a slider threaded on each pin between the adjacent guide block and visor guide shoe, whereby rotation of each visor operating button in one direction draws the respective button and slider toward one another into clamping engagement with the intervening guide block to lock the corresponding visor in a fixed position and rotation of each visor operating button in the opposite direction releases the corresponding visor for adjustment to another position.

References Cited

UNITED STATES PATENTS

| | | | |
|---|---|---|---|
| 1,416,848 | 5/1922 | Lightfield | 2—8 |
| 2,445,355 | 7/1948 | Hurt | 2—10 |
| 2,813,271 | 11/1957 | Finken | 2—6 |
| 3,162,862 | 12/1964 | Miller | 2—6 |
| 3,315,272 | 4/1967 | Olt et al. | 2—6 XR |
| 3,368,220 | 2/1968 | Wenzel | 2—8 |
| 1,683,170 | 9/1928 | Di Carlo. | |

JAMES R. BOLER, Primary Examiner